(12) United States Patent
Wolfgram (10) Patent No.: US 6,948,452 B2
(45) Date of Patent: Sep. 27, 2005

(54) ELECTRIC ANIMAL DETERRENT FOR CONTACT WITH UNDERLYING GROUND SYSTEM

(75) Inventor: Kirk W. Wolfgram, Rochester, MN (US)

(73) Assignee: Wolfgram Industries, Inc., Rochester, MN (US)

(*) Notice: Subject to any disclaimer, the term of this patent is extended or adjusted under 35 U.S.C. 154(b) by 31 days.

(21) Appl. No.: 10/753,228

(22) Filed: Jan. 8, 2004

(65) Prior Publication Data

US 2005/0150469 A1 Jul. 14, 2005

(51) Int. Cl.[7] .......................... A01K 37/00; A01K 3/00
(52) U.S. Cl. ....................... 119/712; 119/721; 119/908; 256/10; 43/98
(58) Field of Search ................ 119/908, 712, 720–721; 43/98; 256/10

(56) References Cited

U.S. PATENT DOCUMENTS

| | | | | |
|---|---|---|---|---|
| 520,510 A | * | 5/1894 | Wilson | 256/14 |
| 1,023,599 A | * | 4/1912 | Takacs | 43/98 |
| 2,512,740 A | * | 6/1950 | Evans | 256/10 |
| 2,555,180 A | * | 5/1951 | Adkins | 256/10 |
| 2,633,337 A | * | 3/1953 | Nieuwenhuis | 256/10 |
| 2,899,174 A | * | 8/1959 | Wells | 256/10 |
| 3,197,916 A | * | 8/1965 | Cole, Jr. et al. | 43/66 |
| 3,392,247 A | * | 7/1968 | Check | 200/86 R |
| 4,114,185 A | * | 9/1978 | Gallagher | 361/232 |
| 4,274,123 A | * | 6/1981 | Rogers, Jr. | 361/232 |
| 4,859,868 A | * | 8/1989 | McKissack | 307/106 |
| 4,949,216 A | * | 8/1990 | Djukastein | 361/232 |
| 4,969,418 A | * | 11/1990 | Jones | 119/712 |
| 5,072,915 A | * | 12/1991 | Shirley | 256/14 |
| 5,107,620 A | * | 4/1992 | Mahan | 43/112 |
| 5,158,039 A | * | 10/1992 | Clark | 119/712 |
| 5,302,945 A | * | 4/1994 | Stoltenberg | 340/660 |
| 5,767,592 A | * | 6/1998 | Boys et al. | 307/108 |
| 5,790,023 A | * | 8/1998 | Wolfgram et al. | 340/564 |
| 5,877,949 A | * | 3/1999 | Wolfgram et al. | 363/61 |
| 5,949,636 A | * | 9/1999 | Johnson et al. | 361/232 |

(Continued)

FOREIGN PATENT DOCUMENTS

GB 2192323 A * 1/1988 .......... A01K 29/00

*Primary Examiner*—Peter M. Poon
*Assistant Examiner*—Andrea M. Valenti (57) ABSTRACT

The present invention provides a high voltage pulse generator used for deterring animals where the high voltage pulses are delivered to the animal through an electrical conductor that lays directly on the ground and is not insulated from the underlying ground system. The invention's high voltage pulse generator has a predetermined output impedance that is significantly lower than the impedance of an animal that may contact either the device's output or a conductor laying on the ground that is connected to the devices output. The invention's high voltage pulse generator also has a predetermined output impedance that is lower than the impedance of the conductor in contact with the underlying ground system. This significantly low output impedance allows the device to deliver maximum output energy to the conductor in contact with the underlying ground system while maintaining high voltage and adequate energy levels to deliver an effective shock for deterring animals. This significantly low output impedance also allows the device to limit the energy delivered to an animal to a small percentage of the devices maximum output such that the shock intensity felt by the animal is at a mild or annoying level for lengths of conductors in contact with the underlying ground system that vary from zero to hundreds or thousands of feet in length or more.

14 Claims, 6 Drawing Sheets

U.S. PATENT DOCUMENTS 6,020,658 A * 2/2000 Woodhead et al. ......... 307/106
6,184,790 B1 * 2/2001 Gerig ..................... 340/573.3
6,371,054 B1 * 4/2002 Celata et al. ............... 119/712
6,519,131 B1 * 2/2003 Beck ......................... 361/232

* cited by examiner

ELECTRIC ANIMAL DETERRENT FOR CONTACT WITH UNDERLYING GROUND SYSTEM

FIELD OF INVENTION

The present invention relates to an electric animal deterrent capable of generating high voltage pulses where the high voltage pulses are delivered to the animal through an electrical conductor that lays directly on the ground and is not insulated from the underlying ground system. More particularly, the invention relates to the output impedance of the device for generating high voltage pulses compared to the impedance of the electrical conductor in contact with the underlying ground system. The invention further relates to the output impedance of the device for generating high voltage pulses compared to the impedance of an animal that may contact the electrical conductor and the underlying ground system for the purpose of limiting shock intensity to a mild or moderate shock.

BACKGROUND OF THE INVENTION

Electric animal deterrents have been used for decades and come in a variety of forms including the electrified mat, the electrified bird feeder typically used to repel squirrels, the shock collar typically for dogs, the stock prod for livestock, and the electrified fence. All electric animal deterrents use high voltage that is delivered to the animal by means of two or more conductors. The high voltage is necessary to penetrate or break down the animal's hair and skin such that current can flow through the animal from one conductor to another. The current passing through the animal is limited or delivered in controlled pulses to keep the shock safe. These limits for safety are defined by safety agencies such as Underwriters Laboratories, Inc. (UL) in publications such as UL69 (Standard for Safety for Electric Fence Controllers).

Present technologies for electric animal deterrents can be categorized in two groups. The first group is electric animal deterrents that use electrical conductors where both conductors are insulated from each other and where both conductors are insulated from the underlying ground system. The second group is electric animal deterrents that use the underlying ground system as one of the conductors and insulate the other conductor from the underlying ground system.

The first group of electric animal deterrents that use electrical conductors where both conductors are insulated from each other and from the underlying ground system would include deterrents such as the electrified mat, the electrified bird feeder, the shock collar, and the stock prod. The electrified mat consists of two electrical conductors physically supported in an insulating material in the form of a mat where both conductors are insulated from each other and are insulated from the underlying ground system. The two conductors in the mat are provided with a high voltage potential between the conductors by means of a high voltage generating circuit. The mat is placed on or over an object to keep animals away by delivering a shock to the animal should the animal touch both conductors in the mat.

The electrified bird feeder typically used to repel squirrels is similar to the electrified mat in that two electrical conductors are electrically insulated from each other and from the underlying ground system. The conductors are placed on the bird feeder (usually by manufacturer's design) in a location to keep the squirrel from sitting near the bird seed. Similar to the electrified mat, the conductors in the electrified bird feeder are provided with a high voltage potential between the conductors by means of a high voltage generating circuit that delivers a shock to the squirrel when it touches both conductors.

The shock collar is also similar to the electrified mat in that two electrical conductors are electrically insulated from each other and from the underlying ground system. The conductors in the shock collar are typically located in the collar or box located on the collar such that the animal (usually dogs) is in contact with each of the conductors. The conductors are provided with a high voltage potential between the conductors such that the animal receives a shock. The shock collar differs from the electrified mat and electrified squirrel feeder in that the high voltage is only present when the shock collar receives a signal. The signal is typically received from an external hand-held transmitter (typically controlled by the animal's owner or trainer), from a buried wire defining a zone where the animal will receive a shock, or from a circuit detecting a noise such as the animal barking, which tells the high voltage circuit to energize the conductors.

The stock prod is also similar to the previously mentioned devices in this group in that they contain two electrical conductors electrically insulated from each other and from the underlying ground system. The stock prod is also similar in that the conductors are provided with a high voltage potential between the conductors by means of a high voltage generating circuit that delivers a shock to the animal when both conductors are placed against the animal. The stock prod differs from the other devices in that a user must place the device against the animal to deliver a shock.

The high voltage generating circuits used for the electrified mat, the electrified bird feeder, the shock collar, and the stock prod are also similar in that they have a similar output impedance or similar load where the circuit delivers it's maximum output power. Since all the devices only have to deliver a shock to the animal when the animal is the only load contact with the conductors, the high voltage generating circuit only has to deliver a high voltage shock when high impedances are in contact with the conductors. For this reason, the output impedance of the high voltage generating circuit associated with these types of devices is typically in the thousands or tens of thousands of Ohms. With this high of output impedance, loads in the hundreds of ohms are adequate to short out the circuit such that the animal will not receive a shock. However, since the conductors are insulated from each other and the only load the circuit is subjected to is the animal, the circuit's high output impedance is adequate to deliver a shock to the animal under the conditions for which the product was designed.

The second group of electric animal deterrents that use the underlying ground system as one of the conductors and insulate the other conductor from the underlying ground system would include the electrified fence. The electrified fence is different from the previously mentioned electric animal deterrents in several ways. First, the electrified fence differs in that the user typically installs a separate electrical conductor system that is connected to the box containing the high voltage generating circuit. The box with the circuit is called an electric fence controller or energizer. The user connects the fence terminal of the electric fence controller to an un-insulated wire that is supported above the underlying ground system on insulators to create a wire fence. This un-insulated wire fence serves as one of the conductors in the system. The electric fence controller is also provided with a ground terminal which the user connects to the underlying ground system by means of a ground rod. When the animal comes in contact with the bare electric fence wire and the underlying ground system, the circuit is completed and the fence controller can deliver a shock to the animal.

Second, the electrified fence differs from previously mentioned electric animal deterrents in that the load seen by the circuit varies greatly due to conditions of the fence. The fence condition can vary due to weed growth between the underlying ground system and the un-insulated fence wire which can cause a ten to one variation in resistance between the conductors for heavy weed growth compared to a weed free installation. In addition to the weed growth, the weeds can vary from dry to wet due to rain resulting in another ten to one change in resistance for wet compared dry weeds. In addition to the weed growth and rain, the fence condition can also vary due to the length of the fence. Various standards in the fence controller industry use values around 500,000 Ohms to represent the resistance (due to leakage of the insulators used to support the fence wire) between the fence wire and the underlying ground system for one mile of 17 gauge, 36 inch high, weed free, dry electric fence wire. With the variation in weed growth and rain, this 500,000 Ohm value drops to 5,000 Ohms for a fence wire that is covered with heavy wet weeds. With variation in fence length, the impedance of the fence can vary from millions of ohms for short, weed free, dry fences down to several hundred ohms for long fences with heavy wet weed growth.

In addition to the user installed conductors and wide variation in fence condition, the fence controller also varies in circuitry and shock intensity. Due to the wide variation in fence condition and the need to provide a shock for long lengths of fence with heavy weed growth in the rain, electric fence controller circuitry has changed over the past several decades. The first fence controller circuits were called continuous current controllers. The output from these types of devices delivered approximately 1000 to 3000 volts AC and had a short circuit current measured in milliamps. These types of devices also had output impedances typically in the tens of thousands of Ohms. The high output impedance caused the fence controller to short out from rain or a small amount of weed growth such that a shock could not be delivered to the animal.

The next generation of fence controllers circuits were pulse type fence controllers. The circuits typically used a capacitive discharge circuit and occasionally used an inductive discharge circuit. The capacitive discharge circuit stored energy in a capacitor and periodically discharged the stored energy into the primary winding of a step-up transformer where the transformer's secondary winding was connected to the fence and ground terminal of the fence controller. The inductive discharge type units had a large step-up transformer and a large supply used to create a high current in the primary winding of the transformer. When the current was turned off in the primary winding, the reverse emf in the transformer created a high voltage pulse in the secondary winding which was connected to the fence and ground terminal of the fence controller. Both the capacitive discharge and inductive discharge circuits were required to have an off period for safety and delivered much higher current than the first generation continuous current type fence controllers. According to safety standards such as Underwriters Laboratories, Inc. (UL) the minimum off-period for type of fence controller is one second. Safety requirements for pulse currents in the pulse type fence controllers vary depending on pulse duration. The capacitive discharge circuits typically delivered higher output currents than the inductive discharge circuits. The capacitive discharge circuits could deliver peak output currents as high as several amps and still be safe according to the UL safety standard. The output impedance of both the capacitive discharge and inductive discharge type circuits was typically in the thousands of Ohms. This lower output impedance compared to the continuous current type fence controllers allowed the pulse type fence controllers to deliver a shock even with some weed growth and/or rain depending on length of the fence provided the impedance of the fence did not fall below the output impedance of the fence controller. In addition to being able to maintain a high voltage on heavier fence loads, the pulse type fence controllers delivered a more intense shock than the continuous current type fence controllers. Although the pulse type fence controllers were better at energizing a fence than the continuous current type units, loads in the hundreds of Ohms would short them out reducing the output voltage such that they could not deliver a shock to the animal.

The most recent technology for fence controllers is called low impedance. Low impedance fence controllers are identical to the capacitive discharge fence controllers previously described except the output impedance is lower, typically in the hundreds of Ohms instead of the thousands of Ohms. This lower output impedance allows the fence controller to maintain a high voltage needed to deliver a shock to the animal when heavier wetter weed growth is in contact with longer lengths of fence. In addition to the improved fence energizing capability, the low impedance type fence controller also delivers a much more intense shock. The increase in shock intensity increases the animal's fear of the electrified fence. The greater the fear the animal has for the fence, the less likely the animal will try to go through the fence. While the animal may have an impedance of around 1000 Ohms, small children have an impedance from hand to foot closer to 500 Ohms. Animals such as a large bull may have an output impedance as high as 4000 Ohms which means for a low impedance fence controller with an output impedance of 500 Ohms, the child will receive more energy and a more intense shock than the bull that contacts the same fence. Even with the higher output energy levels and significantly increased shock intensity from the low impedance type fence controller, the current pulse delivered to a human can remain below the safety limit defined by regulatory agencies such as UL. Even with the increased output energy, the increased shock intensity that approaches the safety limits defined by regulatory agencies, and the lower impedance of the low impedance type fence controller, fence loads involving too much weed growth, too much moisture on weeds and insulators, or a fence wire that lay's directly on the ground resulting in the impedance of the fence falling below the output impedance of the fence controller will cause the fence controller's output voltage to drop such that the fence controller can no longer deliver a shock to the animal. For this reason, the fence controller industry still uses insulators to support the fence wire and recommends for best performance that the fence be clear of any weeds or objects that could short the fence wire to the underlying ground system.

To protect a large area such as a garden or a long length of cable laying on the ground, all of the present electric animal deterrents have disadvantages. The electrified fence works well as a barrier but does not keep the animal out once the barrier has been crossed. This is a major problem with small animals such as rabbits, squirrels, chipmunks, that go under or between the fence wires or dig under the fence. The electrified mat would require covering large areas of the ground to insulate the conductors from weeds and plants that may grow over the insulated section of the mat, the stock prod requires an operator be on guard continuously, and the shock collar requires the animal wear a collar which is not feasible with wild animals. In addition, all the circuits associated with present technology electric animal deterrents short out when both electrical conductors contact the ground. Thus it would be advantageous to provide an electric animal deterrent that deliveres a mild shock by means of an electrical conductor that could be placed directly on the ground without shorting out where the conductor could be placed around a cable to keep animals from chewing on the cable or where the conductor could be placed on the ground in a garden to create a grid the animal would have to step on to remain in the garden. It would also be advantageous to provide such an electric animal deterrent that deliveres no more than a mild or annoying shock for all lengths of conductor system that could be connected to the device for safety purposes.

SUMMARY OF THE INVENTION

The invention provides a high voltage pulse that delivers a mild shock to the animal by limiting the energy delivered to the impedance of the animal. The energy level per pulse is typically less than one half Joule delivered into a 500 Ohm load which is used to represent a small child. While the device delivers a low energy pulse to the 500 Ohm load creating a mild shock when touched, the device also may deliver several Joules of energy at a much lower impedance. While the low impedance capacitive discharge type fence controller typically has an output impedance measured in the hundreds of Ohms, an electric animal deterrent system that can effectively energize a conductor system in contact with the ground must have an output impedance of several Ohms or lower. This lower output impedance causes the shock intensity to drop from very intense and near the safety limits as in the low impedance fence controller to a level that can be described as mild or annoying. With the extremely low output impedance and it's annoying shock intensity, the circuit for effectively energizing a conductor system in contact with the ground becomes ineffective as a fence controller since it reduces the fear level the animal has for the fence. However, the lower energy level and mild shock work well in this application since the area being protected is covered by the conductor system. As long as the animal stays in the area with the grid shaped conductor system or tries to chew on the cable it receives a shock and the intense shock present with the electric fence is not necessary. The lower output impedance in the electric animal deterrent for contact with the underlying ground system also allows the circuit to deliver a mild shock level when hundreds or thousands of feet of conductor on the ground are connected to the output terminals or when only a couple inches of the conductor are connected.

Construction of the electric animal deterrent for contact with the underlying ground system may be identical to the low impedance fence controller except for the step-up transformer connected to the fence and ground terminals. While the step-up transformer in the low impedance fence controller has an output impedance in the hundreds of Ohms, turns ratios around 1:10, and primary turns between 20 and 30 turns, the electric animal deterrent for contact with the underlying ground system has an output impedance of several Ohms, a turns ratio around 1:8, and only a couple or few primary turns.

DETAILED DESCRIPTION OF THE INVENTION

It is well know in the animal deterrent industry as shown by U.S. Pat. No. 4,114,185 issued Sep. 12, 1978 to Gallagher, that low impedance fence controllers require connection to a voltage source, a capacitor that can be charged by said voltage, a timing means for discharging the capacitor at a fixed interval, and a transformer where the primary is connected across the capacitor, where the transformer secondary is connected to output terminals, and where the output impedance of the transformer is less than the impedance of the fence line connected to the low impedance fence controller, typically in the hundreds of Ohms. The electric animal deterrent for contact with the underlying ground system may be identical to low impedance fence controller except of the output impedance of the transformer. The voltage source may be AC or DC and may be self-contained such as an internal battery as found in voltage sources used in the fence controller industry. The capacitor may be charged directly from the voltage source, stepped up in voltage by means of a capacitor multiplier circuit or step-up transformer, stepped up in voltage by means of a DC to DC converter, or charged using any other method including those commonly found in circuits used in electric fence controllers. The timing means may consist of a resistor and capacitor or any other analogue timer or may consist of a digital timer similar to timing circuits found in electric fence controllers. As previously stated, the difference in circuitry between the low impedance electric fence controller and the electric animal deterrent for contact with the underlying ground system is in the output impedance of the step-up transformer. While the low impedance electric fence controller's step-up transformer typically have an output impedance in the hundreds of Ohms, turns ratios around 1:10, and primary turns between 20 and 30 turns, the electric animal deterrent for contact with the underlying ground system has an output impedance of several Ohms, a turns ratios around 1:8, and only a couple or few primary turns. The electric animal deterrent for contact with the underlying ground system may also be provided with duplicate high voltage pulse generating circuits where one circuit is used to generate a positive high voltage pulse relative to the underlying ground system while the other circuit is used to generate a negative high voltage pulse relative to the underlying ground system.

Figure 1:
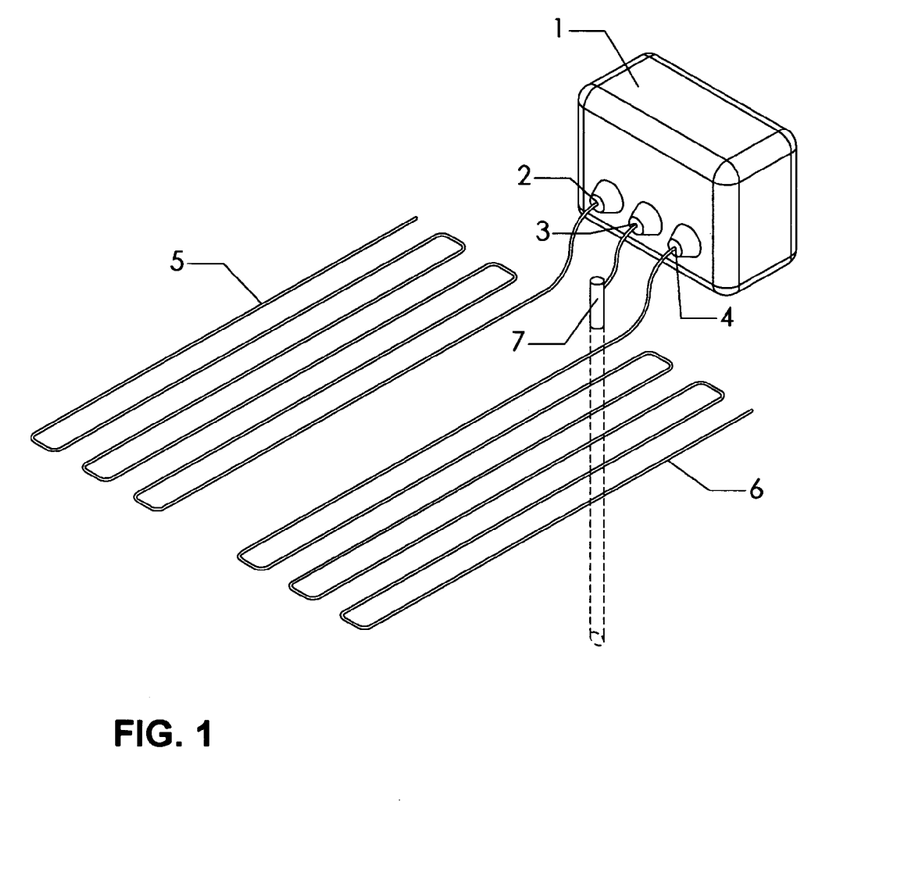
FIG. 1 is an isometric view of a preferred embodiment of the invention provided with two high voltage output terminals of opposite polarity and one ground terminal shown in application where the device is used to deter animals from the area where the electrical conductors are placed directly on the ground.

FIG. 1 shows a preferred embodiment of the electric animal deterrent for contact with the underlying ground system along with an installation. The circuit is provided in a self-contained enclosure 1. The enclosure contains the duplicate high voltage pluse generating circuits previously mentioned where the output of the negative high voltage pulse circuit is provided by means of a negative high voltage output terminal 2 and a ground output terminal 3, and where the output of the positive high voltage pulse circuit is provided by means of the same ground output terminal 3 and a positive high voltage output terminal 4. In this application, the electric animal deterrent for contact with the underlying ground system is used to energize two electrified grids to chase an animal out of a area such as a garden. The ground output terminal 3 is connected to a ground rod 7 driven into the earth. The negative high voltage output terminal 2 is connected to a non-insulated wire 5 which placed on the ground surface in the area intended to repel the animal. The positive high voltage output terminal 4 is also connected to a non-insulated wire 6 which placed on the ground surface also in the area intended to repel the animal. The ground surface in this application is intended to include low laying vegetation and displaced soil that may cover portions of the wire.

The ground rod 7 in FIG. 1 provides a reference for both the positive and negative high voltage pulse circuits. Impedances between the earth and the ground rod 7 may vary and be 100 Ohms or higher. The non-insulated wires 5 and 6 placed directly on the ground to create a negative and positive electrified grid may have impedances as low as several Ohms. In these applications where the impedance of the ground rod 7 is higher than the impedance of the non-insulated wire 5 and 6 placed on the ground to create a negative and positive electrified grid, one grid serves as a reference for the other grid. For this reason, it is important to keep the length of the non-insulated wire 5 and 6 similar in length if similar voltages are desired on each conductor relative to the underlying ground system. In this application, if the animal touches either the positive electrified grid 5 or positive electrified grid 6 and the underlying ground system, or if the animal touches both the positive electrified grid 5 and positive electrified grid 6, the animal will receive a shock.

To improve performance, coating of the non-insulated wire 5 and 6 with a conductive coating such as a conductive thermoplastic will allow longer lengths of wire to be used while still maintaining adequate voltage levels and shock intensity.

Figure 2:
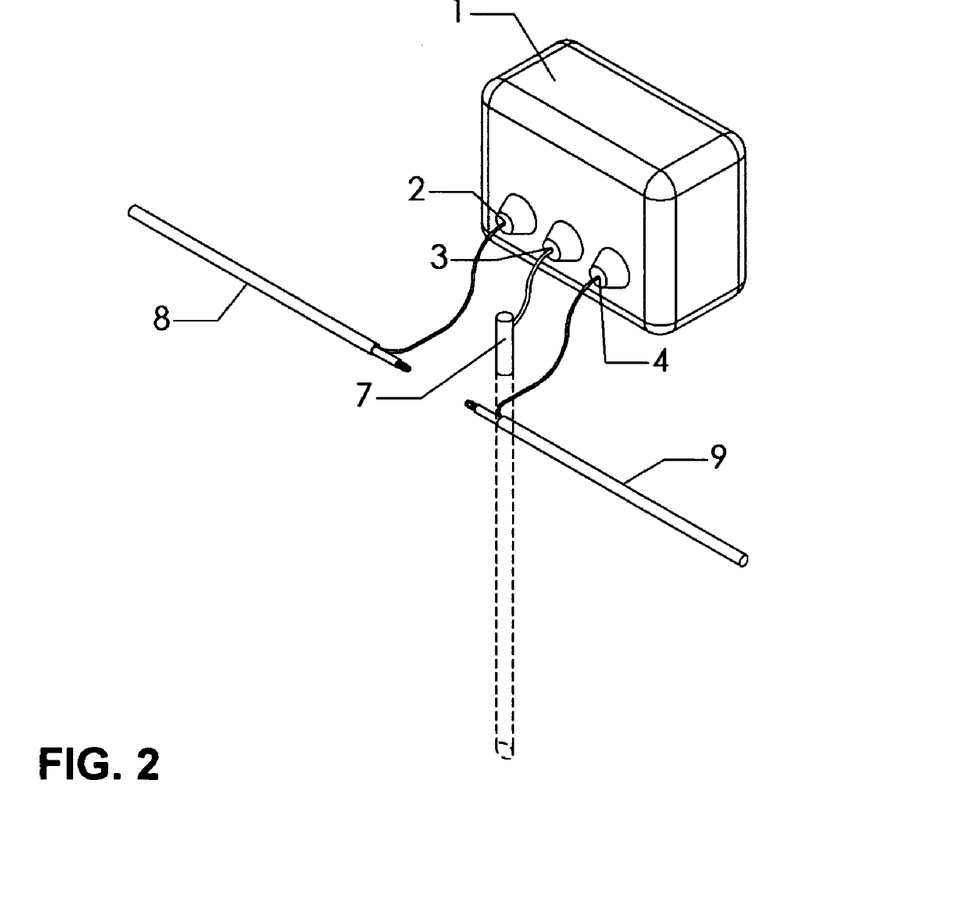
FIG. 2 is an isometric view of a of the same preferred embodiment shown in FIG. 1 provided with two high voltage output terminals of opposite polarity and one ground terminal shown in application where the device is used to deter animals from chewing on a cable where the outer jacket of the cable is an electrical conductor and where the cable is placed directly the ground.

FIG. 2 shows the same preferred embodiment of the electric animal deterrent for contact with the underlying ground system as shown in FIG. 1 except where the device is used to protect a cable from animals chewing on the cable. The duplicate high voltage pulse generating is provided in an enclosure 1 with a negative high voltage output terminal 2, a ground output terminal 3, and a positive high voltage output terminal 4. In this application, the negative high voltage output terminal 2 is connected to an exposed conductive outer shield 8 wrapped around the insulated jacket of a cable placed on the ground. The ground output terminal 3 is again connected to a ground rod 7. The positive high voltage output terminal 4 is also connected to an exposed conductive outer shield 9 wrapped around the insulated jacket on either another cable or a different section of the same cable placed on the ground. As in the application shown in FIG. 1 with the conductive wire grids, impedances between the earth and the ground rod 7 may vary and be 100 Ohms or higher while the impedance of the exposed conductive outer shields 8 and 9 placed on the ground may have impedances as low as several Ohms. In these applications where the impedance of the ground rod 7 is higher than the impedance of the conductive outer shields 8 and 9, one conductive outer shield serves as a reference for the other shield. For this reason, it is important to keep the length of the cables with conductive outer shields 8 and 9 similar in length if similar voltages are desired on each conductor relative to the underlying ground system.

To improve performance, coating of the conductive shield 8 and 9 with a conductive coating such as a conductive thermoplastic will allow longer lengths of cable to be used while still maintaining adequate voltage levels and shock intensity.

Figure 3:
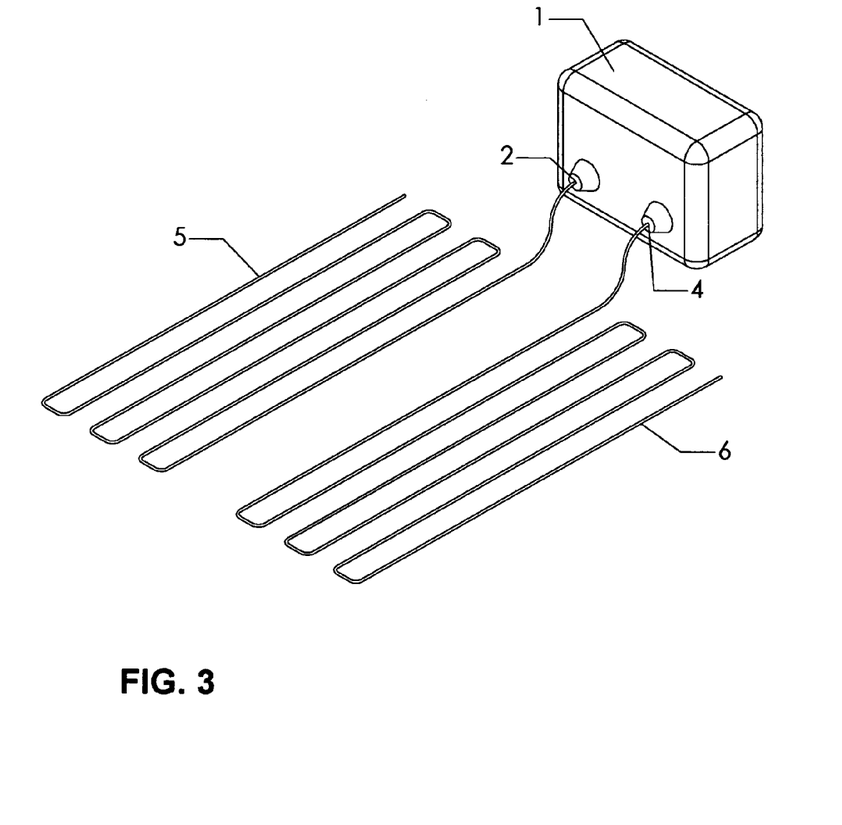
FIG. 3 is an isometric view of an alternate embodiment of the invention provided with two high voltage output terminals of opposite polarity where the device is used to deter animals from the area where the electrical conductors are placed directly on the ground.

FIG. 3 shows an alternate embodiment of the electric animal deterrent for contact with the underlying ground system. In this embodiment, the device is provided with a single high voltage pulse generating circuit in an enclosure 1 where the negative output of the circuit is provided by means of the negative high voltage output terminal 2, and where the positive output of the circuit is provided by means of the positive high voltage output terminal 4. The negative high voltage output terminal 2 is connected to a non-insulated wire 5 which placed on the ground in the area intended to repel the animal. The positive high voltage output terminal 4 is also connected to a non-insulated wire 6 which also placed on the ground in the area intended to repel the animal. In this application of the device, no ground rod is provided and each of the non-insulated wires 5 and 6 serve as a reference for the other non-insulated wire. Without the ground rod as in this application, each of the non-insulated wires 5 and 6 serve as a return for the other non-insulated wire allowing the unit to deliver a shock to the animal when the animal touches either non-insulated wire 5 or 6 and the underlying ground system. In this example, current flows from one conductor through the animal, and through the underlying ground system to the other conductor.

Figure 4:
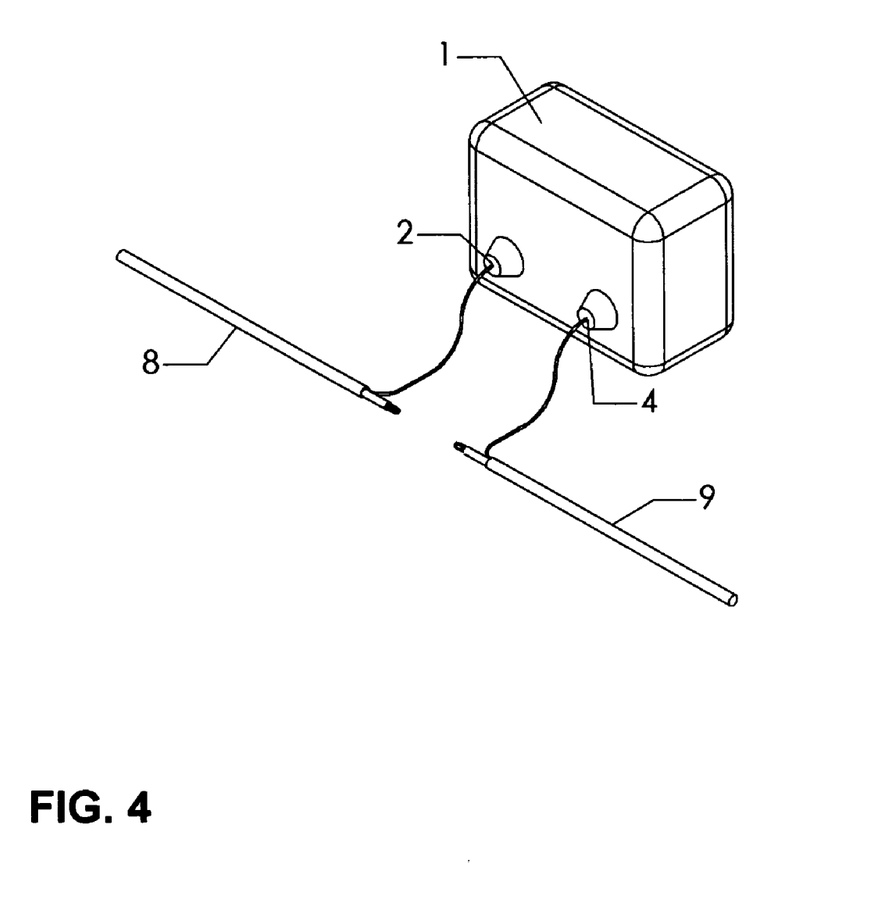
FIG. 4 is an isometric view of the same alternate embodiment shown in FIG. 3 provided with two high voltage output terminals of opposite polarity where the device is used to deter animals from chewing on a cable where the outer jacket of the cable is an electrical conductor and where the cable is placed directly on the ground.

FIG. 4 shows an the same alternate embodiment of the electric animal deterrent for contact with the underlying ground system as FIG. 3 except the application is used to protect a cable from chewing animals. In this embodiment, the device is again provided with a single high voltage pulse generating circuit in an enclosure 1, where the negative output of the circuit is provided by means of the negative high voltage output terminal 2, and where the positive output of the circuit is provided by means of the positive high voltage output terminal 4. In this application, the negative high voltage output terminal 2 is connected to the exposed conductive outer shield 8 wrapped around the insulated jacket of a cable placed on the ground while the positive high voltage output terminal 4 is connected to an exposed conductive outer shield 9 wrapped around the insulated jacket of either another cable or a different section of the same cable. As in FIG. 3, no ground rod is provided and each of the exposed conductive shields 8 and 9 serve as a reference and a return for the other exposed shield.

Figure 5:
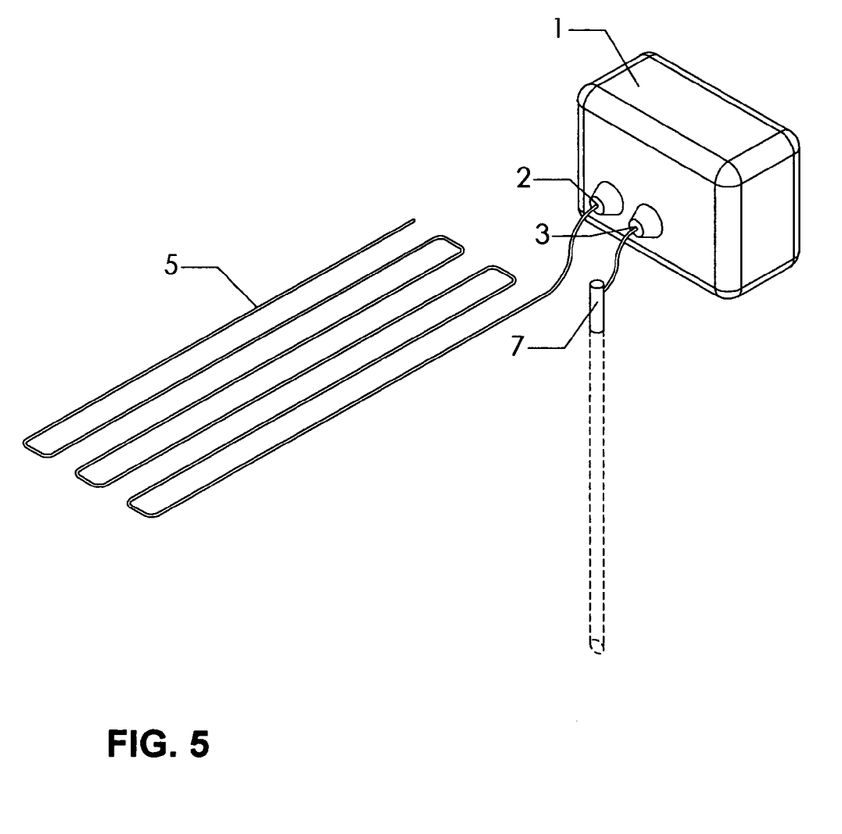
FIG. 5 is an isometric view of yet another alternate embodiment of the invention provided with one high voltage output terminal and one ground terminal shown in application where the device is used to deter animals from the area where the electrical conductor is placed directly on the ground.

FIG. 5 shows yet another alternate embodiment of the electric animal deterrent for contact with the underlying ground system along with an installation. In this embodiment, the device is provided with a single high voltage pulse generating circuit in an enclosure 1, where the negative output of the circuit is provided by means of the negative high voltage output terminal 2, and where the positive output of the circuit is provided by means of a ground output terminal 3. The ground output terminal 3 is connected to a ground rod 7 driven into the earth. The negative high voltage output terminal 2 is connected to a non-insulated wire 5 which placed on the ground in the area intended to repel the animal. Due to the possible lower impedance of the non-insulated wire 5 compared the ground rod 7 with reference to the underlying ground system, this application may require longer ground rods or additional ground rods to keep the ground rod 7 and output ground terminal 3 from being driver to a higher positive voltage than the negative high voltage output terminal 2.

Figure 6:
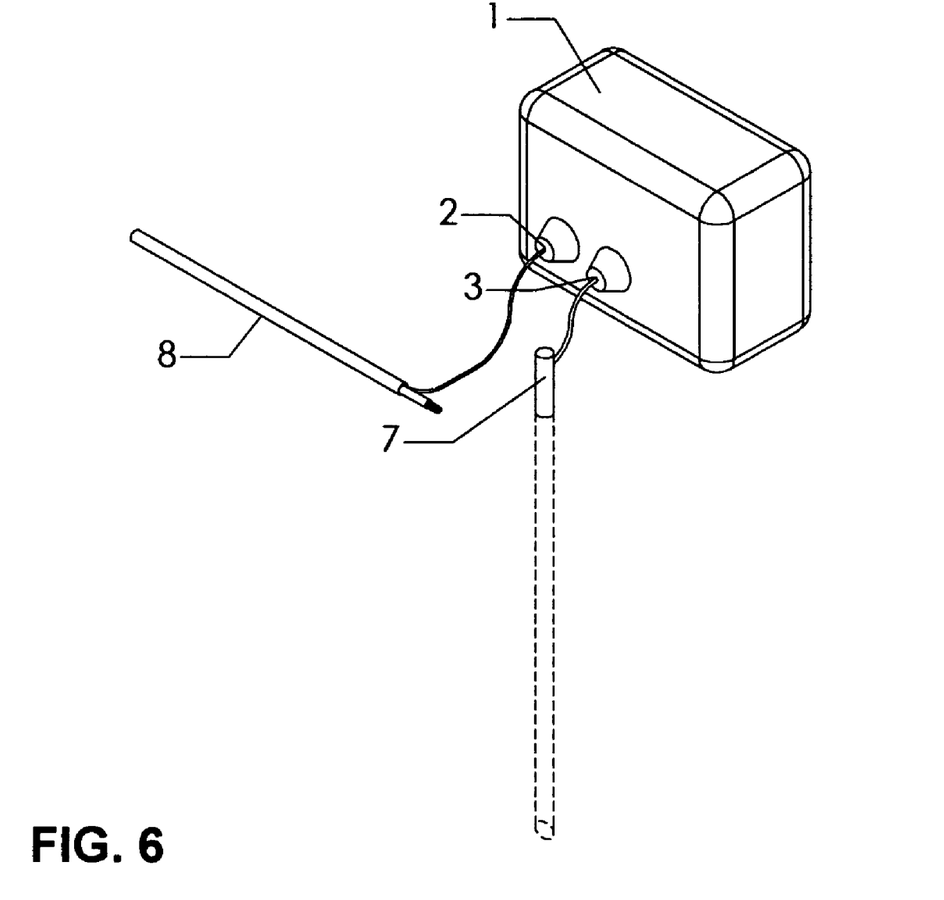
FIG. 6 is an isometric view of a of the same alternate embodiment shown in FIG. 5 provided with one high voltage output terminal and one ground terminal shown in application where the device is used to deter animals from chewing on a cable where the outer jacket of the cable is an electrical conductor and where the cable is placed directly on the ground.

FIG. 6 shows the same alternate embodiment of the electric animal deterrent for contact with the underlying ground system as shown in FIG. 5 except for the application of protecting a cable from chewing animals. In this embodiment, the device is again provided with a single high voltage pulse generating circuit in an enclosure 1, where the negative output of the circuit is provided by means of the negative high voltage output terminal 2, and where the positive output of the circuit is provided by means of a ground output terminal 3. The ground output terminal 3 is connected to a ground rod 7 driven into the earth. The negative high voltage output terminal 2 is connected to the exposed conductive outer shield 8 wrapped around the insulated jacket of a cable placed on the ground. As in FIG. 5, due to the possible lower impedance of the exposed conductive outer shield 8 compared the ground rod 7 with reference to the underlying ground system, this application may also require longer ground rods or additional ground rods to keep the ground rod 7 and output ground terminal 3 from being driver to a higher positive voltage than the negative high voltage output terminal 2.

While several preferred embodiments of the present invention have been described, it should be understood that various changes, adaptations, and modifications may be made therein without departing from the spirit of the invention and the scope of the appended claims.

What is claimed is:

1. An electric animal deterrent for use with a power source comprising:
    a high voltage pulse generator supplied by the power source;
    a timing mechanism for controlling the output pulse rate of said high voltage pulse generator;
    a ground-terminal connected to the output of said high voltage pulse generator for connection to a ground rod electrically connected to an underlying ground system;
    a high voltage output terminal also connected to the output of said high voltage generator connected to a separate un-insulated electrical conductor placed directly on a ground surface for the purpose of deterring animals; and a step-up transformer, wherein output impedance of the step-up transformer is less than 100 ohms and optimally greater than 2 ohms.

2. The electric animal deterrent of claim 1 where the output impedance of the high voltage pulse generator is lower than the impedance of the electrical conductor laying on the ground connected to the high voltage output terminal with reference to the ground terminal and the underlying ground system in which the ground terminal is electrically connected.

3. The electric animal deterrent of claim 1 where the output impedance of the high voltage pulse generator is substantially lower than the impedance of an animal making contact with the electrical conductor connected to the high voltage output terminal and the underlying ground system in which the ground terminal is electrically connected.

4. The electric animal deterrent of claim 1 where energy delivered to an animal making contact with both the electrical conductor connected to the high voltage output terminal and the underlying ground system is significantly less than the energy delivered to an impedance equal to the output impedance of the high voltage pulse generator.

5. The electric animal deterrent of claim 1 where the conductor placed on the ground and connected to the high voltage output terminal is a bare wire.

6. The electric animal deterrent of claim 1 where the conductor placed on the ground and connected to the high voltage output terminal is a bare wire covered by an electrically conductive thermoplastic material of higher resistivity than the bare wire.

7. The electric animal deterrent of claim 1 where the conductor placed on the ground and connected to the high voltage output terminal is a conductive shield on the outside of a cable.

8. An electric animal deterrent for use with a power source comprising:
    a high voltage pulse generator supplied by the power source;
    a timing mechanism for controlling the output pulse rate of said high voltage pulse generator;
    two high voltage output terminals of opposite polarity connected to the output of said high voltage pulse generator connected to separate un-insulated electrical conductors placed directly on a ground surface for the purpose of deterring animals; and a step-up transformer, wherein output impedance of the step-up transformer is less than 100 ohms and optimally greater than 2 ohms.

9. The electric animal deterrent of claim 8 where the output impedance of the high voltage pulse generator is lower than the impedance of the electrical conductors laying on the ground connected to the high voltage output terminals.

10. The electric animal deterrent of claim 8 where the output impedance of the high voltage pulse generator is substantially lower than the impedance of an animal making contact with either electrical conductor connected to the high voltage output terminals and the underlying ground system.

11. The electric animal deterrent of claim 8 where energy delivered to an animal making contact with both the electrical conductor connected to the high voltage output terminals is significantly less than the energy delivered to an impedance equal to the output impedance of the high voltage pulse generator.

12. The electric animal deterrent of claim 8 where either of the conductors placed on the ground and connected to the high voltage output terminals is a bare wire.

13. The electric animal deterrent of claim 8 where either of the conductor placed on the ground and connected to the high voltage output terminals is a bare wire covered by an electrically conductive thermoplastic material of higher resistivity than the bare wire.

14. The electric animal deterrent of claim 8 where the conductors placed on the ground and connected to the high voltage output terminals are a conductive shield on the outside of a cable.

* * * * *